United States Patent
Goodman et al.

(10) Patent No.: US 12,463,826 B2
(45) Date of Patent: Nov. 4, 2025

(54) MULTI-COMPONENT BLUEPRINT DIGITAL SIGNATURES

(71) Applicant: Dell Products L.P., Round Rock, TX (US)

(72) Inventors: Bradley K. Goodman, Nashua, NH (US); Joseph Caisse, Burlington, MA (US); Kirk Alan Hutchinson, Londonderry, NH (US); Daniel E. Cummins, Hudson, NH (US)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 18/646,522

(22) Filed: Apr. 25, 2024

(65) Prior Publication Data

US 2025/0337594 A1    Oct. 30, 2025

(51) Int. Cl.
*H04L 29/06* (2006.01)
*H04L 9/32* (2006.01)

(52) U.S. Cl.
CPC .......... *H04L 9/3247* (2013.01); *H04L 9/3236* (2013.01)

(58) Field of Classification Search
CPC ............................. H04L 9/3247; H04L 9/3236
See application file for complete search history.

(56) References Cited

U.S. PATENT DOCUMENTS

| | | |
|---|---|---|
| 11,853,429 B2 | 12/2023 | Volos et al. |
| 2005/0044197 A1* | 2/2005 | Lai .......................... H04L 67/02 709/223 |
| 2020/0151336 A1 | 5/2020 | Maletsky et al. |
| 2022/0366061 A1* | 11/2022 | Spivack ................ H04L 9/3271 |
| 2023/0325509 A1 | 10/2023 | Schroder et al. |
| 2025/0094591 A1* | 3/2025 | Balin ...................... G06F 21/57 |

OTHER PUBLICATIONS

Stevens, Kevin, et al. "BluePrint: Automatic Malware Signature Generation for Internet Scanning." Proceedings of the 27th International Symposium on Research in Attacks, Intrusions and Defenses. 2024. (Year: 2024).*

Fierrez-Aguilar, Julian, Javier Ortega-Garcia, and Joaquin Gonzalez-Rodriguez. "Target dependent score normalization techniques and their application to signature verification." IEEE Transactions on Systems, Man, and Cybernetics, Part C (Applications and Reviews) 35.3 (2005): 418-425. (Year: 2005).*

* cited by examiner

*Primary Examiner* — Shawnchoy Rahman
(74) *Attorney, Agent, or Firm* — WOMBLE BOND DICKINSON (US) LLP

(57) ABSTRACT

Methods and systems for managing endpoint devices are disclosed. The endpoint devices may be managed by verifying portions of customized blueprints prior to use. To verify the portions of the customized blueprints, the portions of the customized blueprints may be normalized to reduce variability in blueprint content. Once normalized, static content may be identified. Signatures from the portions of the customized blueprints may be used to attempt to verify the integrity of integrity data for the static content. If successfully verified, then the integrity may be used to attempt to verify the integrity of the static content. If the integrity of the static content is verified, then both the static and dynamic content from the portion of the blueprints may be used to update the operation of the endpoint devices.

20 Claims, 16 Drawing Sheets

```
node_templates:                        Section 360
   edge_application:
      type: tosca.nodes.Compute
      properties:
         diskimage: "edgevm.iso"
         hostname: "myhost.example.com"

cloud_application:                  Section 362
      type: tosca.nodes.Compute
      properties:
         diskimage: "cloudvm.iso"
         hostname: "myhost.lab.example.com"
                                       Integrity Data
   authorizations:                          364
      sections:
         - name: edge_application
           digest: sha256: 8678768deace123abcde
         - name: cloud_application
           digest: sha256: 1234aaaa456fffff1234
      approvals:
      pubkey: hzpnaclpub:AtymdtdJW7xmMtX9AEA8/
1UEBD733bpyOUkbTQQi2BE=
         signature: hzpnaclsig:H7G6TGj54543h68Uuk83h68Uuk8GGr=
         format: HZPsig
                                         Signature
                                         Section 366
```

FIG. 3B

```
hostname:
    <illegible>
        substitute: get_attribute
        substitute-allow-only: "*.mygroup.example.com"
```

FIG. 3C

```
num_cpus:
    get_input: number_cpus
    substitute: get_input
    substitute-logic-allow: ($VALUE >=2 )&($VALUE<=8)
```

FIG. 3D

MULTI-COMPONENT BLUEPRINT DIGITAL SIGNATURES

FIELD

Embodiments disclosed herein relate generally to device management. More particularly, embodiments disclosed herein relate to systems and methods to manage use of multi-component blueprints.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components, and hosted entities such applications, may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 3B-3D show examples of blueprints in accordance with an embodiments.

DETAILED DESCRIPTION

Figure 1A:
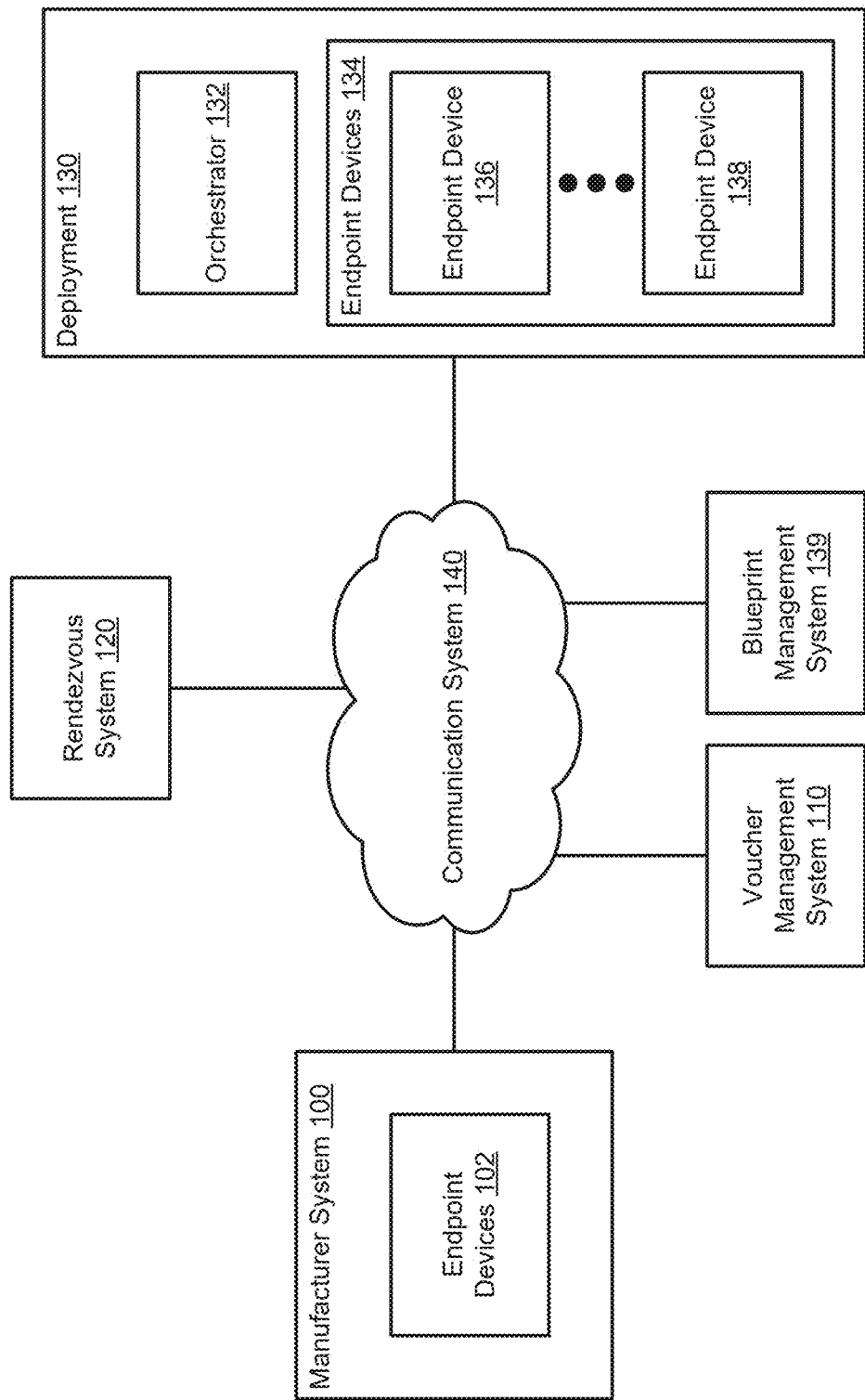
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a distributed system. To manage operation, blueprints may be used to define how endpoint devices of the distributed system are to operate.

At the time of creation, the endpoint devices that may use the blueprints may not be known. To facilitate use of the blueprints with a variety of endpoint, the blueprints may be at least partially parameterized to facilitate customization of the blueprints.

To reduce the likelihood of the blueprints being used to compromise the endpoint devices, only portions of blueprints may be distributed. Static content from the portions of the blueprints may be verified using integrity data from the portions of the blueprints, and signatures may be used to verify integrity of the integrity data. The static content may be defined by an author that is separate from a management system (e.g., an orchestrator) that customizes the blueprints. By dividing the static and dynamic content creation, no single entity if compromised may be able to create a blueprint. Additionally, by only distributing portions of blueprints that have content relative to each device, the blueprints may be less likely to be used to identify how to attack other devices. Consequently, blueprints may be less likely to be usable as attack vectors to attempt to compromise endpoint devices.

In an embodiment, a method for managing operation of an endpoint device is provided. The method may include obtaining a customized blueprint from a management entity; performing a normalization process with respect to the customized blueprint to obtain a normalized customized blueprint; performing a parameter handling process on the normalized customized blueprint to obtain a standardized blueprint; performing a signature verification process for the standardized blueprint to check integrity of integrity data for a static portion of the customized blueprint; in a first instance of the performing of the signature verification where the integrity of the integrity data is not compromised: performing a verification process for the static portion of the customized blueprint using the integrity data; in a first instance of the performing of the verification process where the static portion of the customized blueprint is successfully verified: accepting the customized blueprint; and in a second instance of the performing of the verification process where the static portion of the customized blueprint is successfully verified: rejecting the customized blueprint.

The method may also include, based at least on the customized blueprint being accepted, updating operation of the endpoint device based on the static portion and parameters provided by the management entity.

The method may further include, based on the customized blueprint being accepted, performing a rule verification process for the parameters provided by the management entity, the rule verification being performed using rules from the static portion. The updating the operation of the endpoint device may also be based on an outcome of the rule verification.

The customized blueprint may include a first section comprising a portion of static content and a portion of dynamic content; a second portion comprising the integrity data for the static content of the first section; and a third portion comprising a signature section for the second portion.

The customized blueprint may be based on a non-customized blueprint that includes a fourth section comprising the portion of the static content and a first portion of parameterizations; a fifth section comprising a second portion of static content and a second portion of parameterizations; the second portion; and the third portion.

The portion of the static content may be for a first endpoint device, the second portion of static content may be for another device, and the customized blueprint may not comprise the second portion of static content.

The integrity data may include a hash based on the portion of the static content.

The integrity data may also include a hash based on the second portion of static content, and only the hash for the second portion of static content is not used during the verification process.

The normalization processes may include substituting portions of the customized blueprint with standardized portions based on a set of substitution rules.

The substitution rules may require, at least: replacement of all separators with a first standardized symbol; removal of blank lines; collapsing of contiguous white spaces to a single space; removal of comments; removal of whitespaces that are not necessary for machine interpretation; expression of dictionary and array attributes as multi-line; and ordering of dictionary keys in alphabetical order.

The normalization process may be adapted to remove content perceived to facilitate human interpretation from yet another markup language (YAML) based files.

The parameter handling process may discriminate management entity made parameterized substitutions of the customized blueprint from original non-parameterized content from a non-customized blueprint that is signed by an author of the non-customized blueprint.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, any number of endpoint devices may be deployed to a deployment. The endpoint devices may cooperatively provide the computer implemented services.

To manage the endpoint devices to provide the computer implemented services, authority over the endpoint devices may need to be established. In other words, the endpoint devices must be able to ascertain that they are under the authority of a particular entity. Based on this authority, the entity may, for example, issue work order and/or other types of instructions to manage the operation of the endpoint devices to provide desired computer implemented services.

To facilitate ascertaining of the authority over them, the endpoint devices may utilize secrets. The secrets may allow the endpoint devices to cryptographically verify delegations of authority over the endpoint devices from a root of trust (e.g., a trusted key of a manufacturer) to another entity (e.g., an owner).

Overtime the resources requirements for providing computer implemented services may change and/or endpoint devices may need to be replaced. For example, additional services may be desired to be provided, different types of services may be desired to be provided, etc. In another example, an endpoint device that contributed to the computer implemented services may cease to operate thereby reducing the quantity of resources available to provide the computer implemented services. To satisfy the resource requirements based on these changes to an exist systems, additional endpoint devices may be onboarded and thereby contribute to the resources available to provide the computer implemented services.

During operation, the endpoint devices may be managed by management entity such as an orchestrator. The orchestrator may instruct the endpoint devices to perform various actions. However, if the orchestrator is compromised, then the endpoint devices may also be compromised by virtue of the control that the compromised orchestrator has over the endpoint devices.

In general, embodiments disclosed herein may provide methods, systems, and/or devices for managing endpoint devices to reduce the likelihood of the endpoint devices being compromised. To improve the security of such deployments, embodiments disclosed herein may provide a framework for verifying certain types of instructions received by endpoint devices prior to performance.

Rather than vesting total authority over the endpoints in orchestrators, the framework may divide authority over the endpoint devices between the orchestrators and other entities (e.g., blueprint authors). The other entities may have authority to generate and sign blueprints for the endpoint devices. The blueprints may define, for example, software to be hosted by various devices (e.g., endpoint devices, servers, cloud systems, etc.) and configurations to be used by the various devices. The blueprints may be parameterized and allow for orchestrators to add content usable to direct operation of the endpoint devices. Consequently, the framework may allow for some content of blueprints to be dynamically updated by an orchestrator thereby allowing for some direction to be made dynamically by the orchestrator.

To utilize the blueprints, orchestrators may send relevant portions of the blueprints to corresponding devices. When a portion of a blueprint that has been customized by an orchestrator is received by an endpoint device or other type of device, the endpoint device may use a signature to verify integrity data stored within the portion of the customized blueprint. If the integrity of the integrity data is validated, then the integrity data may be used to check the integrity of static content of the portion of the customized blueprint. The endpoint device may use the outcome of this integrity verification process to decide whether to honor or reject the portion of the customized blueprint. To do so, the endpoint device may normalize the customized blueprint, manage dynamic content added to the customized blueprint by the orchestrator, and use the signature and integrity data to verify integrity and trust in the static content. Other types of verification operations may also be performed to check the dynamic content of the portion of the customized blueprint. If successfully verified, then the endpoint device may honor the portion of the customized blueprint by using the portion of the customized blueprint to update its operation. Otherwise, the endpoint device may reject use of the portion of the customized blueprint. Similar process may be performed by other devices that received other portions of the customized blueprint from the orchestrator.

By doing so, embodiments disclosed herein may improve the security of distributed systems by facilitating verification of static content of customized blueprints. Consequently, activity of compromised management entities (e.g., a man in the middle between a blueprint author and an endpoint device) may be less likely to negatively impact endpoint devices. Thus, malicious activity may be more likely to be constrained within the distributed system until the root cause for the malicious activity is addressed.

Additionally, by only providing relevant portions of each customized blueprint to corresponding devices, a compromised device that receives the portion of the customized blueprint may not be able to use the other information from other portions of the customized blueprint. For example, different portions of the customized blueprint may indicate how other devices operate. A malicious entity may use this information to attempt to compromise a device. By limiting distribution of this information from the customized blueprints, malicious entities may be prevented from using it even when endpoint devices that receive portions of the customized blueprints are compromised (e.g., via means other than information obtained from customized blueprint portions).

To provide the above noted functionality, the system of FIG. 1A may include manufacturer system 100, voucher management system 110, rendezvous system 120, deployment 130, blueprint management system 139, and communication system 140. Each of these components is discussed below.

Manufacturer system 100 may be a system used by a manufacturer of endpoint devices 102. Manufacturer system 100 may include, for example, factories, assembly plants, distribution facilities, and/or other types of facilities for creating endpoint devices 102. Endpoint devices 102 may be data processing systems which may be usable to provide various computer implemented services.

When manufactured, manufacturer system 100 may put endpoint devices 102 in condition for subsequent onboarding to various deployments (e.g., 130) and/or other environments (e.g., data centers, edge systems, etc.) in which endpoint devices may be positioned to provide desired computer implemented services.

Figure 1B:
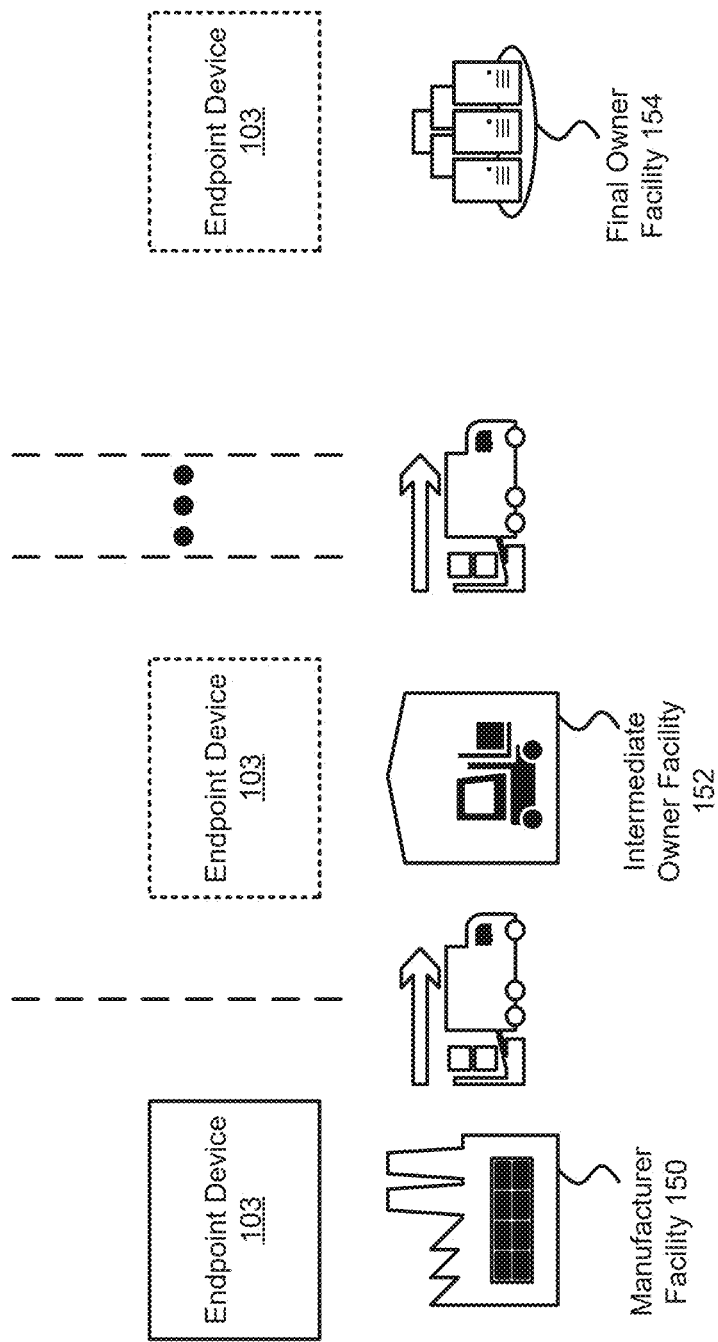
FIGS. 1B-1J show diagrams illustrating aspects of operation of the system of FIG. 1A in accordance with an embodiment.
Figure 1C:
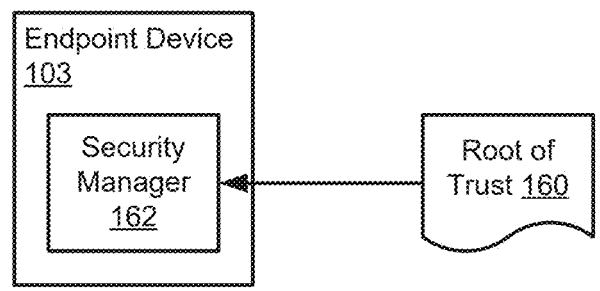

To place endpoint device 102 in condition for subsequent onboarding, manufacturer system 100 may (i) establish a root of trust for each endpoint device, (ii) record various information regarding the endpoint devices (e.g., hardware/software loadout, identifiers of various components positioned therein, etc.), and (iii) install various pieces of software, establish various configuration settings, update various hardware components, and/or perform other actions so that only entities to which authority over the endpoint devices has been delegated from the root of trust are able to control and/or otherwise use the endpoint device. Refer to FIG. 1C for additional details regarding establishing a root of trust for the endpoint device.

Once constructed, endpoint devices 102 may be sold directly to end users and/or placed into the stream of commerce (e.g., sold to resellers, etc.) and through which endpoint devices 102 may eventually reach end users. The intermediate owners may make modifications to the hardware and/or software of the endpoint devices. Refer to FIG. 1B for additional details regarding how endpoint devices may reach end users (e.g., individuals, organizations, etc.).

As ownership over the endpoint devices changes, information regarding the changes in ownership and/or authority may be recorded in an ownership voucher. The ownership voucher may allow an end user to establish authority over the endpoint device such that the endpoint device will be usable by the end user.

Voucher management system 110 may document and manage information regarding changes in ownership and authority over endpoint devices 102. To do so, voucher management system 110 may generate ownership vouchers. An ownership voucher may be a cryptographically verifiable data structure usable to establish which entities have authority over endpoint devices 102.

For example, an ownership voucher may include certificate chains that documents the changes in ownership and authority over endpoint devices 102. Each certificate may be signed using various keys. The keys used to sign (e.g., private keys) and keys included in (e.g., public keys) in ownership vouchers may enable endpoint devices to ascertain whether to trust various data structures, such as work orders which may be signed. Refer to FIGS. 1D-1I for additional information regarding ownership vouchers.

When one of endpoint devices 102 is obtained by an end user, the end user may add the endpoint devices to a collection such as deployment 130. When so added, an orchestrator (e.g., 132) or other entity may utilize a corresponding ownership voucher from voucher management system 110 to establish authority over the endpoint device. In this manner, any number of endpoint devices (e.g., 134) may be onboarded and brought under the control of a control plane which may include any number of orchestrators (e.g., 132). Different endpoint devices (e.g., 136, 138) may be onboarded at different points in time and/or for different purposes.

However, as noted above, adding an endpoint devices to endpoint devices (e.g., 134) of a deployment may present risk to the endpoint device should the orchestrator become compromised. To reduce such risks, orchestrator 132 may participate in the distributed framework by (i) obtaining blueprints (e.g., from blueprint management system 139), (ii) customizing the blueprints, and (iii) using portions of the customized blueprints to manage operation of endpoint devices 134. Refer to FIGS. 2A-2E for additional details regarding using blueprints to manage endpoint devices and/or other types of devices.

When one of endpoint devices 102 initially powers on after manufacturing and prior to onboarding, the endpoint device may reach out to rendezvous system 120. Rendezvous system 120 may be a system that directs endpoint devices to entities such as orchestrator 132 that will onboard the endpoint devices.

To do so, the entities such as orchestrator 132 may provide rendezvous system 120 with information usable to authenticate that orchestrator 132 will manage the endpoint devices. For example, orchestrator 132 may provide information from ownership vouchers and/or other sources to rendezvous system 120. Once verified, rendezvous system 120 may redirect endpoint devices to the corresponding entities when the endpoint devices reach out to rendezvous system 120 after being powered on.

Once onboarded, endpoint devices 134 may perform various operations to complete onboarding. The operations may include any number and type of operation (e.g., configuration operations, security operations, software installation operations, account establishment operations, etc.), and the operations may be directed by orchestrator 132. Once onboarded, the endpoint devices may begin to contribute to computer implemented services provided by deployment 130.

For example, orchestrator 132 may customize and provide portions of customized blueprints to endpoint devices 102. Doing so may cause the endpoint devices 134 to update their operation, thereby causing the endpoint devices to provide different computer implemented services. Refer to FIG. 2E for additional details regarding use of portions of customized blueprints.

Blueprint management system 139 may facilitate blueprint generation as part of the distributed authority framework. For example, blueprint authors (e.g., privileged users) may define blueprints using interfaces provided by blueprint management system 139. The blueprints may be defined using a markup language such as yet another markup language (YAML). Once generated, blueprint management system 139 may facilitate (i) generation of integrity verification data for various portions of static content of the blueprints, and (ii) signing of the generated blueprint (e.g., more specifically the integrity verification data) using keys associated with the blueprint authors, or other privileged entities.

Some portions of the blueprints may be parameterized and allow for customization by orchestrator 132. For example, the parameterization may allow for custom values to be added to certain portions of the blueprints.

When the blueprints are signed, the signatures may only be based on the integrity verification data. The integrity verification data may, in turn, be usable to verify integrity of static content of the blueprints. The parameterized portions may not be measured in the process of generating the integrity verification. By doing so, the signatures and integrity verification data may be used to verify integrity and trust in at least the static content of the blueprints, which may greatly reduce the likelihood of a blueprint serving as an attack vector for a compromised orchestrator through dynamic content customization in the blueprints. Refer to FIG. 2D for additional information regarding generation of integrity data and signing of blueprints. Refer to FIGS. 3B-3D for example of content of blueprints.

When providing their functionality, any of manufacturer system 100, endpoint devices 102, voucher management system 110, rendezvous system 120, deployment 130, orchestrator 132, endpoint devices 134, and/or blueprint management system 139 may perform all, or a portion, of the processes, interactions, and methods illustrated in FIGS. 1B-3A.

Any of manufacturer system 100, endpoint devices 102, voucher management system 110, rendezvous system 120, deployment 130, orchestrator 132, endpoint devices 134, and blueprint management system 139 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 140. Communication system 140 may facilitate communications between the components of FIG. 1A. In an embodiment, communication system 140 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1A as including a limited number of specific components, a system in accordance with an embodiment may include fewer, additional, and/or different components than those illustrated therein.

As discussed above, endpoint devices (e.g., 102) may traverse through a stream of commerce between when the endpoint devices are manufactured and when the endpoint devices reaches a final owner. Turning to FIG. 1B, diagram of an example path through a stream of commerce in accordance with an embodiment is shown.

In FIG. 1B, vertical dashed lines indicate different geographic locations in which various facilities may be positioned. Representations of such facilities (e.g., 150-154) may be positioned below the pages. Representations of movement of endpoint devices between these facilities is illustrated using truck shaped images. Some instances of the graphical representation of endpoint device 103 are illustrated using dashed outlining to indicate that endpoint device 103 may only be present at one of the facilities at any point in time, and the instance of the graphical representation of endpoint device 103 drawn in solid outlining indicates where endpoint device 103 is located in the example shown in FIG. 1B.

The stream of commerce may begin, for example, at manufacturer facility 150. Manufacturer facility 150 may be a facility operated by a manufacturer of endpoint devices. During manufacturing, the manufacturer may establish a root of trust for an endpoint device (e.g., 103), install various software, add hardware components, etc. Refer to FIG. 1C for additional details regarding establishing the root of trust for endpoint device 103. The root of trust may be used by endpoint device 103 to discern which entities have authority over it, which entities to trust, and/or for other purposes. The initial root of trust may indicate that the manufacturer is the owner of and has authority over endpoint device 103.

Once the root of trust is established, endpoint device 103 may be sold and resold to various intermediate owners. These intermediate owners may operate various intermediate owner facilities (e.g., 152), such as warehouses, distribution centers, sales rooms, etc. When sold, endpoint device 103 may be shipped to these various facilities. While at these facilities, various software and/or hardware component modifications may be made. Accordingly, the state of endpoint devices 103 may change.

Finally, once purchased from an intermediate owner, a final owner may operate a final owner facility (e.g., 154), such as a data center, edge deployment, and/or other type of computer deployment to which endpoint device 103 may be onboarded. To facilitate onboarding, voucher management system 110 may collect and add information regarding changes in ownership of endpoint device 103 to an ownership voucher. Orchestrator 132 may use the ownership voucher to establish authority over endpoint device 103. Refer to FIG. 1I-1J for additional details regarding establishing authority over endpoint devices during onboarding.

Turning to FIG. 1C, a diagram of an example process for establishing a root of trust in endpoint device 103 in accordance with an embodiment is shown. To establish a root of trust, when endpoint device 103 is manufactured, root of trust 160 may be installed in endpoint device 103.

Root of trust 160 may be a public key of a public private key pair controlled by the manufacturer of endpoint device 103. The public private key pair may be established using any process.

To install root of trust 160, root of trust 160 may be stored in endpoint device 103. The storage location and security precautions taken with respect to storing root of trust 160 may vary depending on the architecture of endpoint device 103.

For example, endpoint device 103 may host or include a security manager (e.g., 162). Security manager 162 may be implemented using a discrete hardware component, or may be a software component. Security manager 162 may enforce various security policies on endpoint device 103. For example, the security policies may require that endpoint device 103 validate authority over it back to root of trust 160 before complying with any instructions from other entities that allege to have authority over endpoint device 103.

To validate entities having authority over endpoint device 103, endpoint device 103 may utilize ownership vouchers.

Figure 1D:
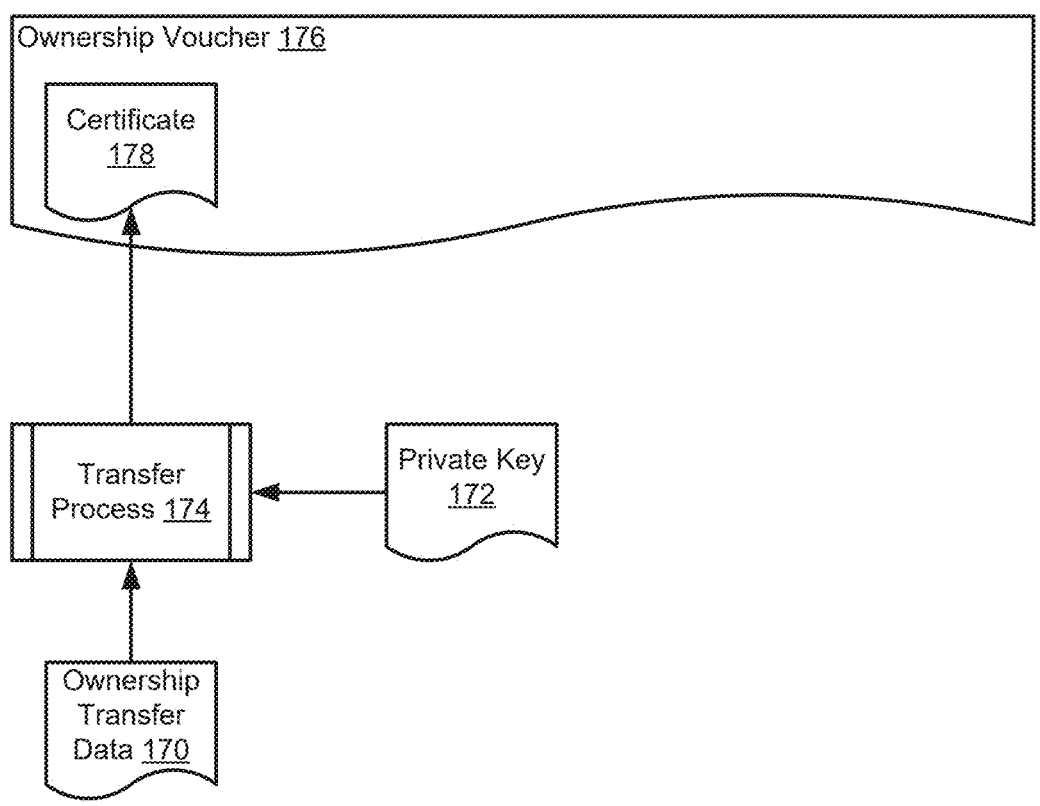
Figure 1E:
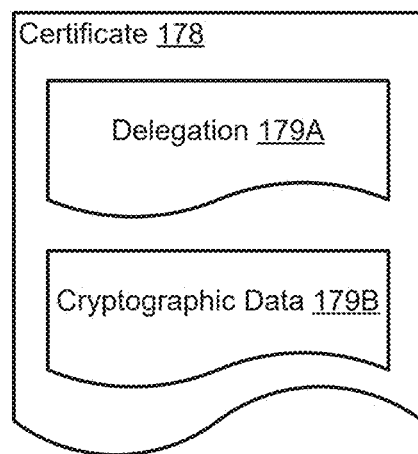

Turning to FIG. 1D, a diagram of an example process for generating ownership voucher 176 in accordance with an embodiment is shown. To generate ownership voucher 176, information regarding changes in ownership and authority over an endpoint device may be added. The information may take the form of a cryptographically verifiable certificate (e.g., 178). Refer to FIG. 1E for additional information regarding certificate 178.

To add a certificate to ownership voucher 176, transfer process 174 may be performed. During transfer process 174, ownership transfer data 170 and private key 172 may be obtained. Ownership transfer data 170 may document a change in ownership and/or authority over an endpoint device. For example, when an endpoint device is sold, a public key of a public private key pair controlled by the purchaser may be added to ownership transfer data 170, along with other types of information regarding the transfer. This public key may be usable to verify signed work orders or other signed data structures from the new owner (e.g., the new owner may be able to use the corresponding private key for signing). The information in ownership transfer data 170 may be treated as a delegation statement, which an endpoint device may parse to identify entities having authority over it.

Figure 1F:
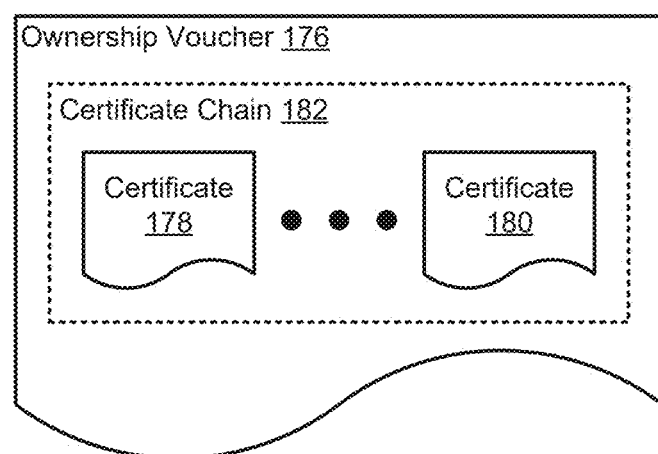
Figure 1G:
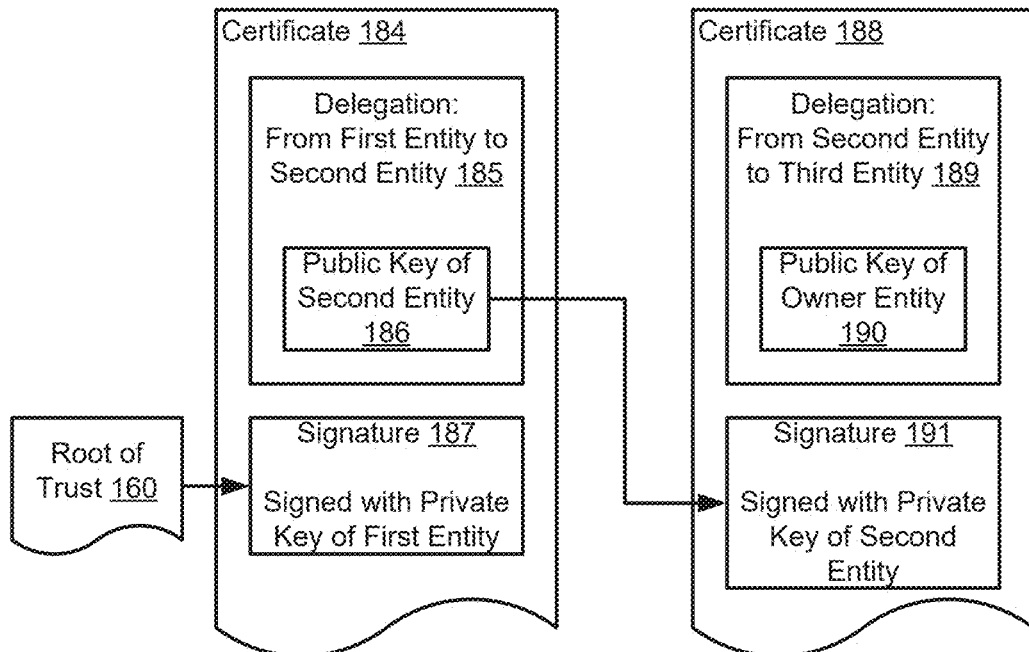
Figure 1H:
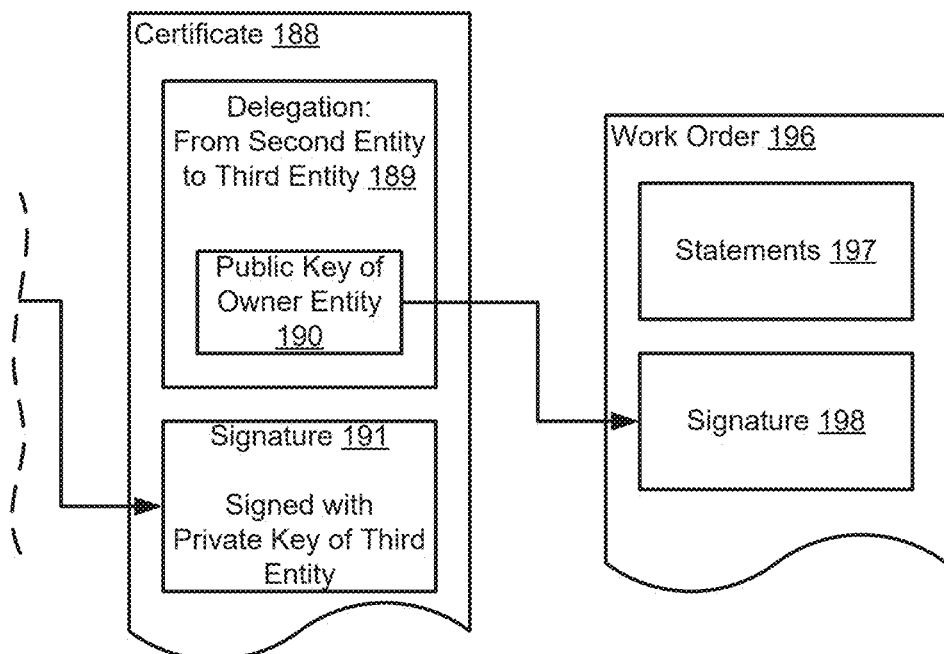
Figure 1I:
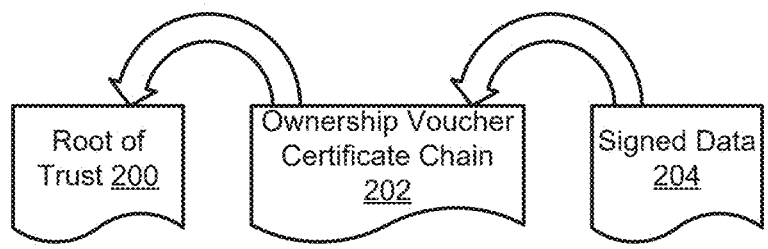
Figure 1J:
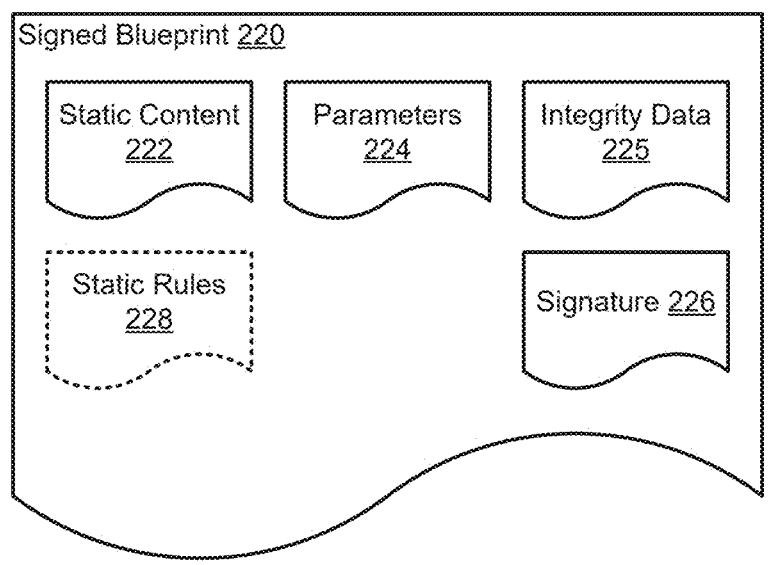

Private key 172 may be a private key of a public private key pair controlled by an entity that has authority over an endpoint device at the time authority over the endpoint device changes (e.g., via sale or other mechanism). In a scenario in which the manufacturer is the seller, the private key corresponding to the root of trust may be private key 172. Similarly, in a scenario in which an intermediate owner is the seller, private key 172 may be the private corresponding to the public key included in the delegation statement in ownership voucher 176 that establishes the intermediate owner has the owner of the endpoint device. In other words, to establish a delegation of authority, the entity that has authority over the endpoint device as defined by the certificates of ownership voucher 176 may need to sign the ownership transfer data 170 to further delegate ownership and authority over the endpoint device. By doing so, a chain of delegations that are cryptographically verifiable back to the root of trust may be established. Refer to FIGS. 1F-1H for additional details regarding establishing chains of delegations.

Any number of certificates may be added to ownership voucher 176 thereby enabling certificate chains that establish chains of delegation from the root of trust for an endpoint device. Ownership voucher 176 may, as discussed above, be used during onboarding.

Turning to FIG. 1E, a diagram of an example certificate 178 in accordance with an embodiment is shown. Certificate 178 may include delegation 179A and cryptographic data 179B.

Delegation 179A may include information documenting a delegation of authority/ownership over an endpoint device. For example, delegation 179A may include a public key, and indicate what is delegated to the entity that has control over the public private key pair of which the public key is a member. The extent of what is delegated may be specified at a macro level (e.g., ownership) or a micro level (e.g., limited authority).

Cryptographic data 179B may include signature usable to verify the integrity of delegation 179A and ascertain whether delegation 179A is valid.

To determine whether certificate 178 includes a valid delegation, an endpoint device may attempt to establish a chain of delegations back to the root of trust.

Turning to FIG. 1F, a diagram of an example certificate chain 182 of ownership voucher 176 in accordance with an embodiment is shown. Certificate chain 182 may be a series of certificates that can be sequentially validated back to the root of trust. To sequentially validate the certificate back to the root of trust, the first certificate (e.g., 178) in the chain may attempt to be validated using the root of trust (e.g., a public key). Thus, the first certificate in the chain may only be validated if the private key (e.g., controlled by the manufacturer) corresponding to the root of trust was used to sign certificate 178. Other certificates in the chain may be similarly validated by using the public key from the delegation statement of the previous certificate to check the signature in the next certificate in the chain. Certificate chain 182 may include any number of certificates (e.g., 178-180) that can be sequentially verified back to the root of trust. Refer to FIGS. 1G-1H for additional information regarding establishing valid certificate chains.

Turning to FIG. 1G, a diagram of an example process for validating a portion of a certificate chain of an ownership voucher in accordance with an embodiment is shown. In FIG. 1G, two certificates (e.g., 184, 188) from a certificate chain are shown.

As seen, certificate 184 may include delegation 185 which includes a public key (e.g., 186) of a second entity. The delegation statement may indicate that a first entity is delegating authority to the second entity.

Certificate 184 may include signature 187. Signature 187 may be generated using a private key controlled by the first entity that delegated authority to the second entity. In this example, the private key may correspond to root of trust 160 (e.g., may be a private corresponding to the public key installed when an endpoint device is manufactured).

To establish a certificate chain, signature 187 may be checked using root of trust 160. If verified as having been signed using the private key corresponding to the root of trust, then certificate 184 may be treated as being valid.

Like certificate 184, certificate 188 may include delegation 189 which includes a public key (e.g., 190) of a third entity, and in this example the owner. The delegation statement of delegation 189 may indicate that the second entity is delegating authority to the third entity (i.e., the owner).

Certificate 188 may include signature 191. Signature 191 may be generated using a private key controlled by the second entity that delegated authority to the third entity. In this example, the private key may correspond to the public key (e.g., 186) of the second entity which may be included in delegation 185.

To extend the certificate chain, signature 191 may be checked using public key of second entity 186. If verified as having been signed using the private key corresponding to public key of second entity 186, then certificate 188 may be treated as being valid.

Once the chain is established, the delegations (e.g., 185, 189) in the chain may be parsed to identify keys to which authority has been delegated from root of trust 160. These public key may then be used to decide whether various work orders are valid, which entities have authority of an endpoint device, and/or for other purposes.

For example, during onboarding, an endpoint device may evaluate whether to perform various work orders using the keys to which authority has been delegated.

Turning to FIG. 1H, a diagram of an example process for validating a work order in accordance with an embodiment is shown. In FIG. 1H, only a portion of the certificates (e.g., 184, 188) shown in FIG. 1G are shown for clarity.

When a work order (e.g., 196) is received by an endpoint device, the endpoint device may evaluate whether the entity issuing the work order has authority over the endpoint device. To do so, the endpoint device may parse the certificates to identify the public keys to which authority over the endpoint device has been delegated.

The endpoint device may then, using the keys, check a signature (e.g., 198) included in the work order. If the signature can be verified as having been generated using the private key corresponding to one of the public keys to which authority over the endpoint device has been delegated, then the endpoint device may treat work order 196 as having been issued by an entity with authority over it. For example, signature 198 may be checked using public key of owner entity 190, in this example.

The endpoint device may then, for example, process various statements 197 included in work order 196, and take action based on those statements. These statements may include instructions that change the manner of operation of the endpoint device to, for example, comply with security requirements of a new owner, and/or perform other actions.

However, even if validated, performance of the workorder by an endpoint device may present risk. For example, if statements 197 indicate that a portion of a blueprint is to be used, the content of the portion of the blueprint may have at least been partially dynamically modified by an orchestrator. If the content is dynamically modified by a compromised orchestrator, then the modified content may present risk to the endpoint device.

For example, turning to FIG. 1I which shows a diagram in accordance with an embodiment, signed data 204 such as a work order may be validated if public keys included in ownership voucher certificate chains (e.g., 202) correspond to private keys to which the work order issuing entity has access. In this example, ownership voucher certificate chain 202 may be used to establish delegations of authority from root of trust 200 for an endpoint device to the keys used to sign signed data 204.

However, if the delegations are to a compromised orchestrator, then the verification back to the root of trust may be insufficient to mitigate risk presented by the compromised orchestrator.

To reduce the likelihood of such compromises from impacting the services provided by a deployment, the endpoint devices may be required to also verify integrity of blueprints prior to use. FIG. 1J shows an example of data structures that may be used in such processes.

Turning to FIG. 1J, a diagram illustrating an example signed blueprint 220 in accordance with an embodiment is shown. Signed blueprint 220 may be a blueprint created and signed by an author. Signed blueprint 220 may include static content 222, parameters 224, signature 226, and static rules 228. Each of the portions of signed blueprint 220 is discussed below.

Static content 222 may include any number of lines of interpretable instructions. The instructions may be completely defined, or may be parameterized to allow an orchestrator to add additional content. For example, any of the lines of static content 222 may reference any of parameters 224.

Static content 222 may be divided into portions relevant to different devices. For example, static content 222 may include some lines for use with an edge device and other lines for use with a cloud system that cooperatively provide a service. These different portions may only be relevant to updating the respective devices.

Parameters 224 may include any number of parameters that may be defined by an orchestrator dynamically. For example, when a blueprint is created by an author, a name of an endpoint device with which it is used may not be known. To facilitate use of the blueprint, a portion of static content 222 may state that "a node" and reference a parameter of parameters 224. For example, the line may read "on node <NODE>". The recitation <NODE> may be interpreted as a parameter that may be set at a later point in time. Static content 222 and parameters 224 may define any number of such statements that enable an orchestrator to adapt signed blueprint 220 for use with an endpoint device.

Parameters 224 may be defined using any amount of information. For example, parameters 224 may include lines that indicate information that is to be obtained and added, as well as explicit indications that the corresponding portions of signed blueprint 220 are referencing attributes. Additionally, parameters 224 may include prescriptive information regarding how the parameters are to be obtained and/or used. For example, the prescriptive information may indicate whether corresponding portions of signed blueprint 220 are or are not part of the static content of signed blueprint 220. Thus, the prescriptive information may be used to discriminate portions of signed blueprint 220 that are to be ingest for integrity data generation purposes, from other portions of signed blueprint 220 that are excluded due to being dynamic content (e.g., which may not be verifiable using the integrity data if the parameters are substitute with actual values after the integrity data is created).

Integrity data 225 may include hashes or other derived data structures usable to check the integrity of portions of static content 222. For example, integrity data 225 may include hashes of different portions of static content 222 corresponding to different devices.

Signature 226 may be signature for signed blueprint 220 generated with a trusted private key of a key pair with a published public key. For example, the trusted public key may be associated with an author of signed blueprint 220.

Signature 226 maybe generated based on integrity data 225 (and/or other static content of blueprint that are not subject to modification by orchestrators during use of the blueprint).

For example, signature 226 may use integrity data 225 as an ingest to a signing algorithm. The output of the signing algorithm may be signature 226.

In another example, the blueprint on which signed blueprint 220 is based may have included static content 222, parameters 224, integrity data 225, and static rules 228. To generate signature 226, only the static portions (e.g., 222, 225, 228) may be used as ingest to a signature algorithm after normalization of the base blueprint. Thus, the signature may be usable to verify the integrity and trust in the static portions of signed blueprint 220. Signature 226 may be stored in a portion of signed blueprint 220 marked as including such information (e.g., an authorization section). The authorization section may also include information regarding how to use the signature such as, for example, (i) indications of a format of the signature, (ii) descriptions of types of keys used in signing, (iii) attestations or other permissions to establish trust in the signing keys, etc.

Static rules 228 may include information regarding limits, requirements, and/or other information regarding parameters. Static rules 228, as noted above, may be an ingest to the integrity data generation process and/or signature generation process. Thus, static rules 228 may be verified using integrity data 225 and/or signature 226.

Static rules 228 may be associated with different parameters and may limit how information may be added. For example, static rules 228 may define the information that may be substituted into parameters 224 of signed blueprint 220. If information that does not meet the definition is attempted to be added, static rules 228 may allow that information to be identified and used to conclude that a customized blueprint is not valid.

Static rules 228 may be simple (e.g., may specify types) or complex (e.g., may utilize formals, algorithms, etc.). Thus, complex evaluations of dynamically added content may be performed using static rules 228 to ascertain whether a customized blueprint is valid.

For example, static rules 228 may (i) identify what is disallowed from use as a parameter, (ii) identify an explicit array of items to be allowed (rather than just a single) as a parameter, (iii) identify option of an array or string, (iv) identify ability to specify (possibly priority-ordered) list of "allow" vs "deny" rules, (v) identify whether to include an end or default "allow" or "deny" policy if no matches have been otherwise found, (vi) facilitate use of use of regular expressions (rather than just simple wildcard strings), etc.

Thus, once established, signed blueprint 220 may be used to established customized blueprints for use with endpoint devices while not ceding all authority over content of blueprints to orchestrators. Refer to FIG. 3B for an example of content of a customized blueprint based on a signed blueprint.

Figure 2A:
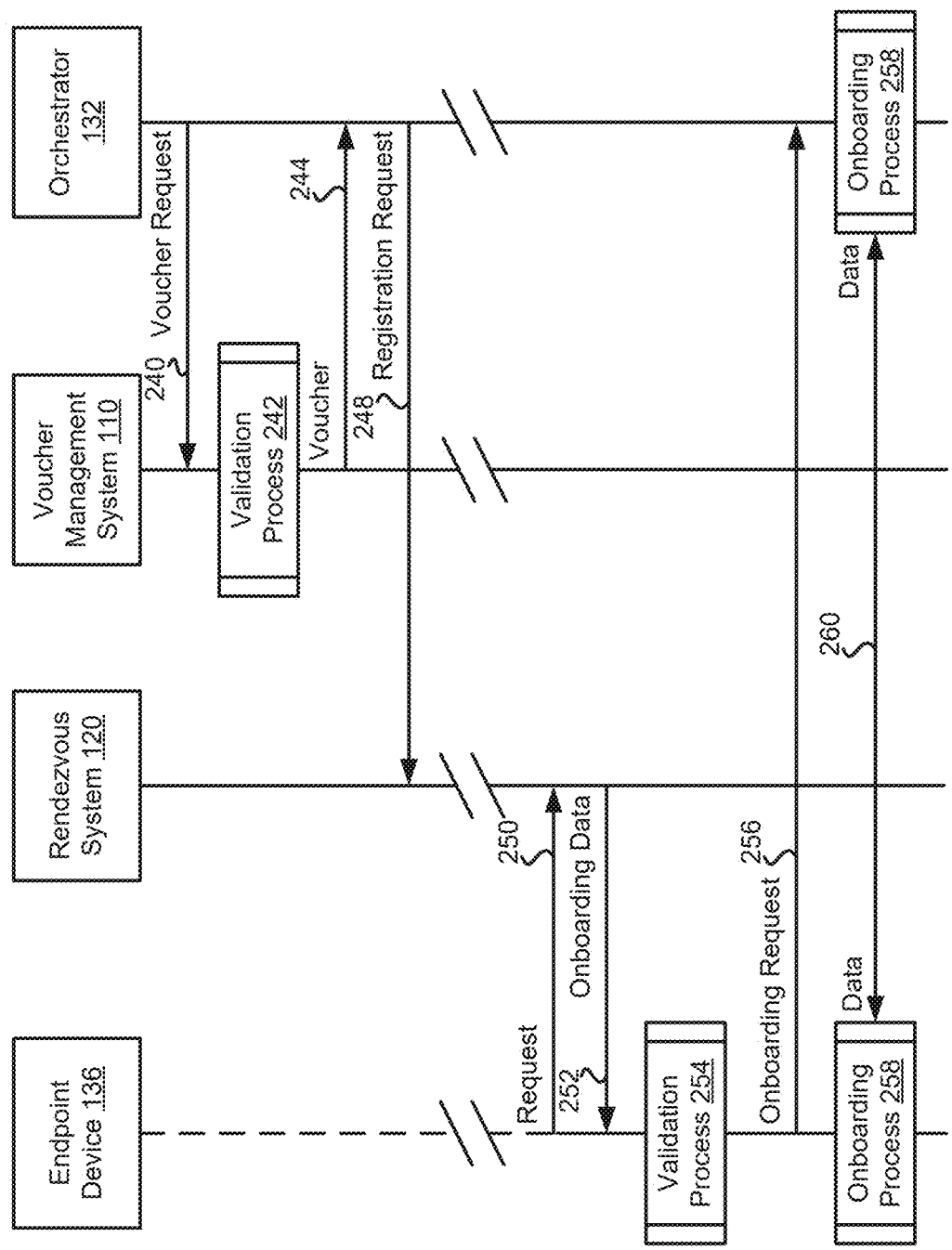
FIGS. 2A-2B show interaction diagrams in accordance with an embodiment.
Figure 2B:
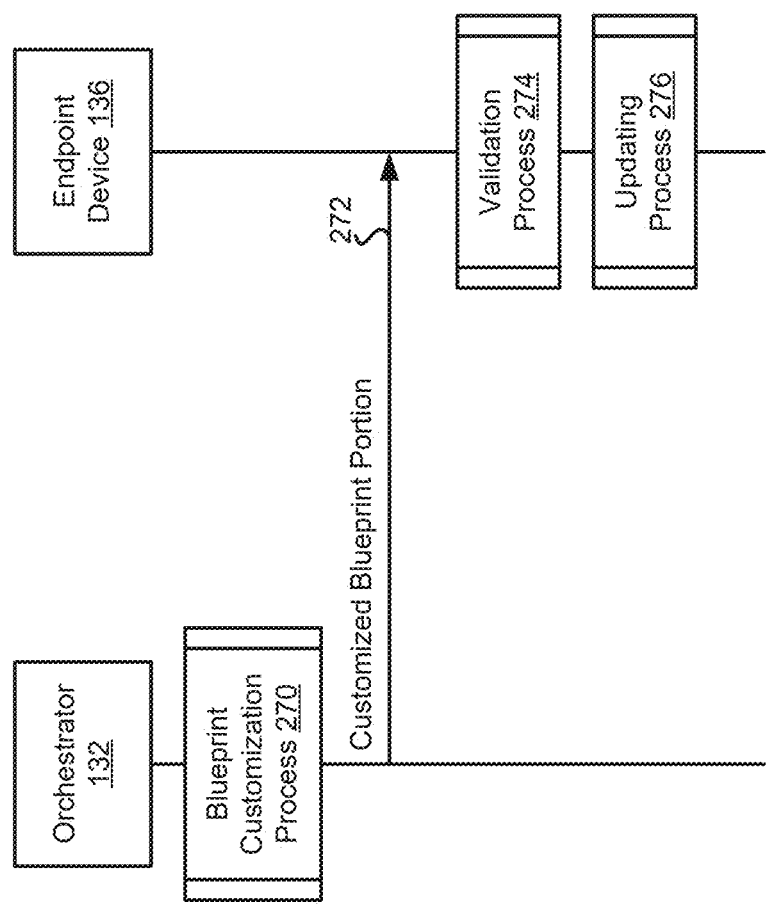

To further clarify embodiments disclosed herein, interactions diagrams in accordance with an embodiment are shown in FIGS. 2A-2B. These interactions diagrams may illustrate how data may be obtained and used within the system of FIGS. 1A-1J.

In the interaction diagrams, processes performed by and interactions between components of a system in accordance with an embodiment are shown. In the diagrams, components of the system are illustrated using a first set of shapes (e.g., 110, 120, 132, 136, etc.), located towards the top of each figure. Lines descend from these shapes. Some descending lines are drawn in dashing to indicate that the device is not operating during corresponding periods of time, while other lines are drawn solid to indicate that the devices are operating during the corresponding period of time. For example, in FIG. 2A, endpoint device 136 may not be operating until interaction 250.

Processes performed by the components of the system are illustrated using a second set of shapes (e.g., 242, 254, etc.) superimposed over these lines. Interactions (e.g., communication, data transmissions, etc.) between the components of the system are illustrated using a third set of shapes (e.g., 240, 244, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 240 may occur prior to the interaction labeled as 244. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during onboarding of an endpoint device.

To onboard endpoint device 136, orchestrator 132 may, at interaction 240, send a voucher request to voucher management system 110. The voucher request may be a request for an ownership voucher for an endpoint device (e.g., 136). In the example interactions shown in FIG. 2A, an entity may have purchased endpoint device 136 thereby causing voucher management system 110 to add information to the ownership voucher for endpoint device 136 that establishes chains of certificates/delegations from the root of trust to the owner.

When received, voucher management system 110 may attempt to validate the voucher request by performing validation process 242. During validation process, credentials and/or other information from orchestrator 132 may be evaluated to ascertain whether an ownership voucher should be provided. Presuming that the validation process is successful, at interaction 244, voucher management system 110 may send an ownership voucher to orchestrator 132.

Once obtained, at interaction 248, orchestrator 132 may send a registration request to rendezvous system 120. The registration request may be a request to have rendezvous system 120 redirect endpoint device 136 to orchestrator 132. The registration request may include information usable by rendezvous system 120 to verify that orchestrator 132 should have authority over endpoint device 136 (e.g., may be portions of the ownership voucher, or entire ownership voucher).

Once endpoint device 136 reaches a destination location (e.g., a data center, edge deployment, etc.), endpoint device 136 may be powered on and may, at interaction 250, send a request to rendezvous system 120 regarding which entity to contact as part of an onboarding procedure.

Presuming the rendezvous system 120 registered orchestrator 132 based on the registration request, rendezvous system may, at interaction 252, provide onboarding data to endpoint device 136. The onboarding data may include, for example, various validation information and re-direct information (e.g., network address) for orchestrator 132.

Once obtained, endpoint device 136 may perform validation process 254. During validation process 254, endpoint device 136 may attempt to validate the onboarding data. If successfully validated, endpoint device 136 may, at interaction 256, generate and send an onboarding request to orchestrator 132. The onboarding request may request, for example, cryptographic data such as ownership vouchers.

Send of the onboarding request may initiate performance of onboarding process 258. During the onboarding process, orchestrator 132 may provide endpoint device 136 with the ownership voucher and/or other information to enable endpoint device 136 to ascertain whether orchestrator 132 has authority over endpoint device 136. To do so, endpoint device 136 may, as discussed above, attempt to validate certificate chains and delegation statements to establish a chain of delegation of authority from the root of trust to orchestrator 132 (e.g., the delegation statements may identify a particular public key for which orchestrator 132 controls a corresponding private key). Endpoint device 136 may issue various challenges (e.g., signing challenges) to orchestrator 132, and endpoint device 136 may test the signed responses to the challenges using the particular public key. If the signed responses can be validated using the public key, then endpoint device 136 may conclude that orchestrator 132 has authority over it.

If successfully validated as having authority over it, endpoint device 136 may continue to participate in the onboarding by, for example, evaluating the trustworthiness of signed work orders issued by orchestrator 132, and complying with any signed work orders that can be validated as having been signed with the private key corresponding to the particular public key.

The aforementioned work orders may cause endpoint device 136 to, for example, modify its configuration, install/remove software, enable/disable various hardware components, establish accounts for end users, and/or perform other operations as directed by orchestrator 132. The aforementioned operations may place endpoint device 136 in an operating state specified by the owner of endpoint device 136.

If any workorder includes a portion of a customized blueprint (e.g., have parameters replaced with real data), then endpoint device 136 may attempt to validate the portion of the customized blueprint prior to use.

Turning to FIG. 2B, a second interaction diagram in accordance with an embodiment is shown. The second interaction diagram may illustrate processes and interactions that may occur during use of blueprints in management of endpoint devices.

To manage endpoint device 136 using a signed blueprint, orchestrator 132 may perform blueprint customization process. During blueprint customization process 270, orchestrator 132 may fill the parameters of a signed blueprint. Orchestrator 132 may do so using any methodology thereby creating a customized blueprint. Refer to FIG. 2E for additional information regarding customization of blueprints.

Once the customized blueprint is obtained, at interaction 272, orchestrator 132 may provide a portion of the customized blueprint to endpoint device 136. Various workorders or other instructions to use the portion of the customized blueprint may be provided along with the portion of the customized blueprint. The portion may be relevant to endpoint device 136, while other portions may not be relevant. By only providing the relevant portion, risk of use of the customized blueprint to compromise various devices may be reduced.

Figure 2C:
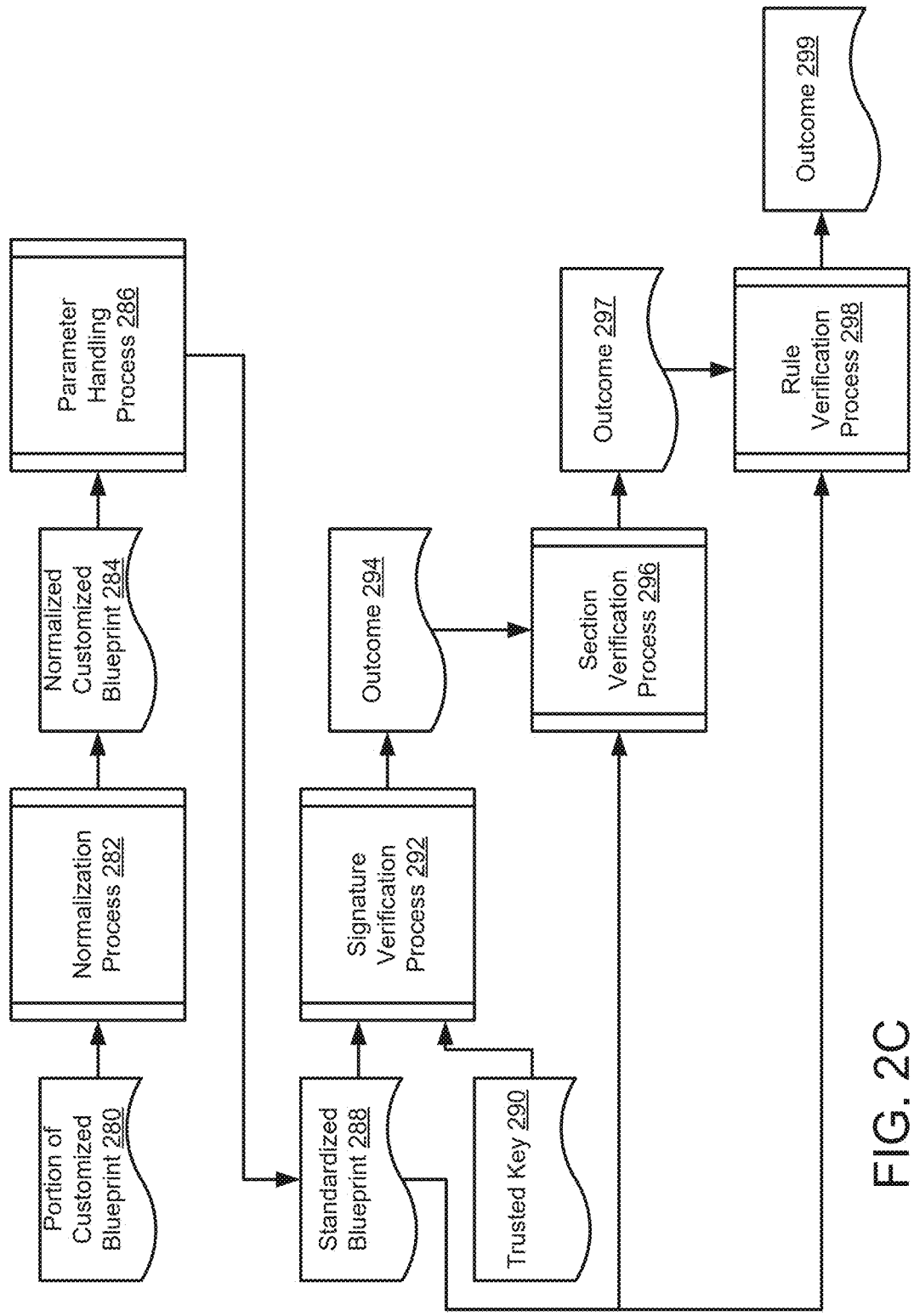
FIGS. 2C-2E show data flow diagrams in accordance with an embodiment.
Figure 2D:
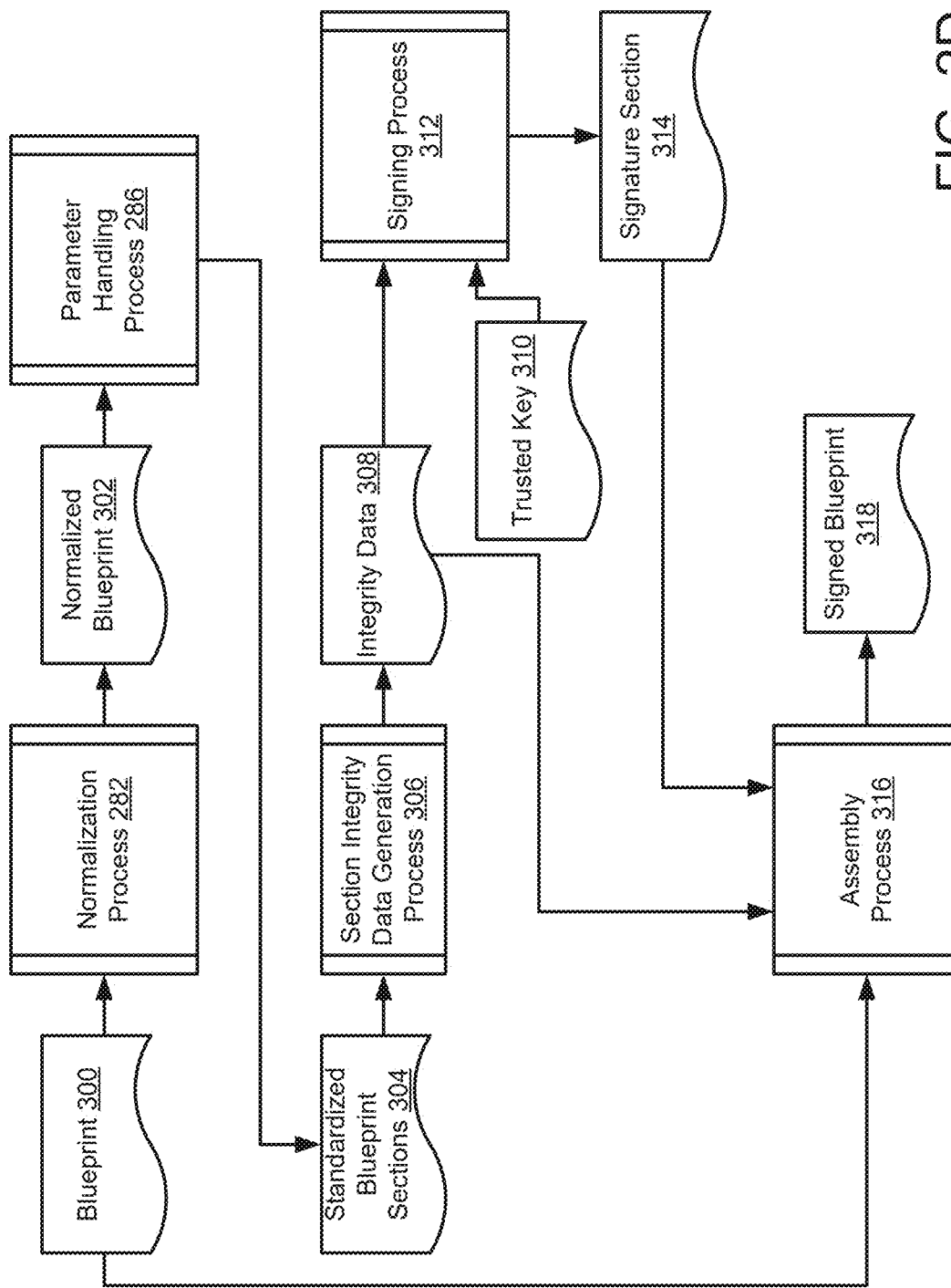
Figure 2E:
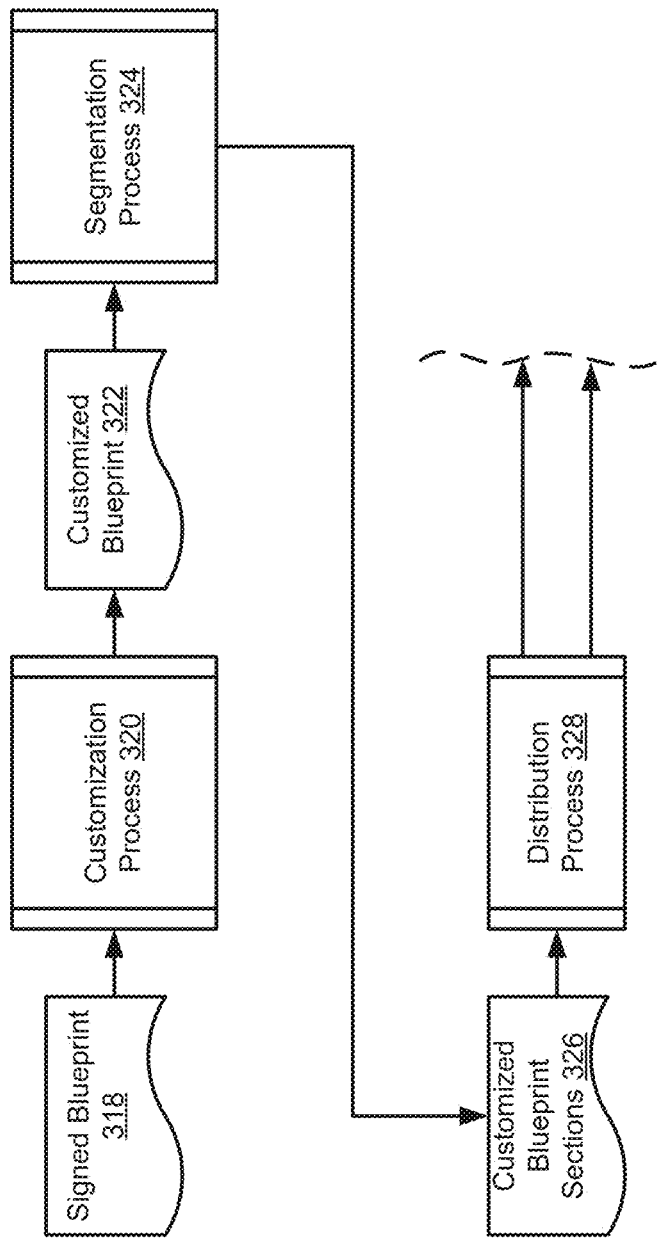

Once obtained, endpoint device 136 may perform validation process 274. During validation process 274, endpoint device 136 may attempt to validate the portion of the customized blueprint. To do so, endpoint device 136 may normalize, standardize, and attempt to verify a signature, integrity data, and static content of the portion of the customized blueprint. Refer to FIG. 2C for additional information regarding verification of portions of customized blueprints.

If successfully validated, endpoint device 136 may perform updating process 276. During updating process 276, endpoint device 136 may use a successfully validated portion of a blueprint to update its operation. Any number of actions may be performed based on the content of the blueprint.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

To further clarify embodiments disclosed herein, data flow diagrams in accordance with an embodiment is shown in FIGS. 2C-2E. In the diagrams, flows of data and processing of data are illustrated using different sets of shapes. A first set of shapes (e.g., 280, 284, etc.) is used to represent data structures, and a second set of shapes (e.g., 282, 286, etc.) is used to represent processes performed using and/or that generate data.

Turning to FIG. 2C, a first data flow diagram in accordance with an embodiment is shown. The first data flow diagram may illustrate data used in and data processing performed in attempting to validate portions of customized blueprints.

To attempt to validate a portion of customized blueprint 280, normalization process 282 may be performed. During normalization process, the content of portion of customized blueprint 280 may be subject to any number of modifications to eliminate variability in the structure of portion of the customized blueprints. The normalization process may be performed using a set of rules.

The set of rules may require (i) replacement of all separators with a first standardized symbol; (ii) removal of blank lines; (iii) collapsing of contiguous white spaces to a single space; (iv) removal of comments; (v) removal of whitespaces that are not necessary for machine interpretation; (vi) expression of dictionary and array attributes as multi-line; (vii) ordering of dictionary keys in alphabetical order, and/or other changes to the content of portion of customized blueprint 280.

Applying the set of rules may result in normalized customized blueprint 284. Once obtained, parameter handling process 286 may be performed. During parameter handling process 286, the dynamic content from normalized customized blueprint 284 may be identified and marked or otherwise removed from consideration for signature verification purposes. For example, as discussed above, parameterized portions of portion of customized blueprint 280 may include implicit or explicit designations. These designations may be used to identify the dynamic content that may be changed by an orchestrator after integrity data and signatures are generated, and the identified dynamic content may be excluded. Thus, the static content of normalized customized blueprint 284 that can be verified using a signature and/or integrity data of normalized customized blueprint 284 may be identified.

The resulting markings may be stored as standardized blueprint 288. Once obtained, signature verification process 292 may be performed. During signature verification process 292, a signature verification algorithm may be performed with respect to standardized blueprint 288 using trusted key 290. The signature verification algorithm may only use the integrity data as ingest.

The performance of the algorithm may identify the integrity as either having been modified or retained since the signature was generated. The result may be stored as outcome 294.

If outcome 294 is positive, then section verification process 296 may be performed. During section verification process 296, the integrity of the static content of standardized blueprint 288 may be checked. For example, the integrity data may include a hash of the static content. A similar hash may be generated and compared to the included hash from integrity data. If the hashes match, then the static content may be deemed to have not been modified after the integrity data and signature were created. However, if the hashes differ, then the static content may be deemed to have been modified after the integrity data and signature were created. The outcome of the check may be stored as outcome 297.

It will be appreciated that integrity data may include various hashes usable to check the static content of other portions of the customized blueprint on which portion of customized blueprint 280 is based. Only the corresponding hash may be used in section verification process 296.

If the static content is deemed to have not been modified, portion of customized blueprint 280 may be concluded to be sufficiently trustworthy for use.

If outcome 294 or 297 is negative, then customized blueprint 280 may not be considered to be trustworthy.

If portion of customized blueprint 280 includes static rules, then rule verification process 298 may also be performed. During rule verification process 298, the static rules may be used to identify whether the replacement data for the parameters (e.g., the substitutions made by the orchestrator) is valid. For example, any static rule may specify requirements, criteria, etc. for discriminating valid versus invalid data used for substitution.

If any of the substitutions are deemed to be invalid, then portion of customized blueprint 280 may not be considered to be trustworthy. However, if all substitutions are deemed to be valid, then portion of customized blueprint 280 may be considered to be trustworthy. The outcome may be stored as outcome 299.

If deemed to be trustworthy, then the endpoint device may honor portion customized blueprint 280. For example, portion of customized blueprint 280 may be used to update the operation of the endpoint device (e.g., installing/removing software, modifying configurations, etc.).

Turning to FIG. 2D, a second data flow diagram in accordance with an embodiment is shown. The second data flow diagram may illustrate data used in and data processing performed in customizing of blueprints.

To customize blueprint 280, normalization process 282 may be performed and through which normalized blueprint 302 may be obtained. Refer to the description of FIG. 2C for additional details regarding normalization process. In contrast to normalized customized blueprint 284, normalized blueprint 302 may include various sections of static content corresponding to any number of devices.

Once obtained, parameter handling process 286 may be performed with respect to normalized blueprint 302 to obtain standardized blueprint section 304. Refer to the description of FIG. 2C for additional information regarding parameter handling process 286.

The resulting standardized blueprint section 304 may then be ingested by section integrity data generation process 306. During section integrity data generation process 306, hashes or other data structures usable to verify the integrity of corresponding portions of the static content of standardized blueprint section 304 for each device. In this manner, hashes or other data structures corresponding to the portions of static content of standardized blueprint section 304 that are relevant to different devices may be generated. The hashes or other data structures may be stored as integrity data 308. References between the data structures and the corresponding relevant sections of standardized blueprint section 304 may also be stored with integrity data 308.

Once integrity data 308 is obtained, signing process 312 may be performed. During signing process 312, a trusted key (e.g., 310, a private key of an author of a blueprint or other entity) may be used to sign integrity data 308 thereby generating signature section 314 (e.g., may include the signature, information regarding how the signature was generated, etc.).

Once obtained, assembly process 316 may be performed. During assembly process 316, integrity data 308 and signature section 314 may be added to blueprint 300 to obtain signed blueprint 318. The resulting signed blueprint 318 may be usable by an orchestrator to update operation of various devices.

Turning to FIG. 2D, a third data flow diagram in accordance with an embodiment is shown. The third data flow diagram may illustrate data used in and data processing performed in updating operation of devices using blueprints.

To update operation of a device using signed blueprint 318, customization process 320 may be performed. During customization process 320, parameters of signed blueprint 318 may be substituted with desired values by an orchestrator other entity, thereby generating customized blueprint 322.

Once obtained, customized blueprint 322 may be ingested by segmentation process 324. During segmentation process, customized blueprint 322 may be segmented to obtain customized blueprint sections 326. Each of customized blueprint sections 326 may include (i) a portion of static content and replacement values for parameters referenced by the static content that is relevant for a particular device, (ii)

the integrity data from signed blueprint 318, and (ii) the signature section from signed blueprint 318.

Once obtained, distribution process 328 may be performed. During distribution process 328, the orchestrator may send portions of customized blueprint sections 326 to corresponding devices. Consequently, each device may only receive portion of customized blueprint 322 that includes instructions relevant to that device. The portions may be sent via any method (e.g., illustrated in FIG. 2E using arrows directed toward the dashed line).

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, the flow, processes, and interactions shown in FIGS. 2A-2E may be used to reduce the likelihood of endpoint devices being compromised through use of dynamically customizable blueprints by verifying the integrity of and trust in the blueprints and limiting distribution of the blueprints.

Figure 3A:
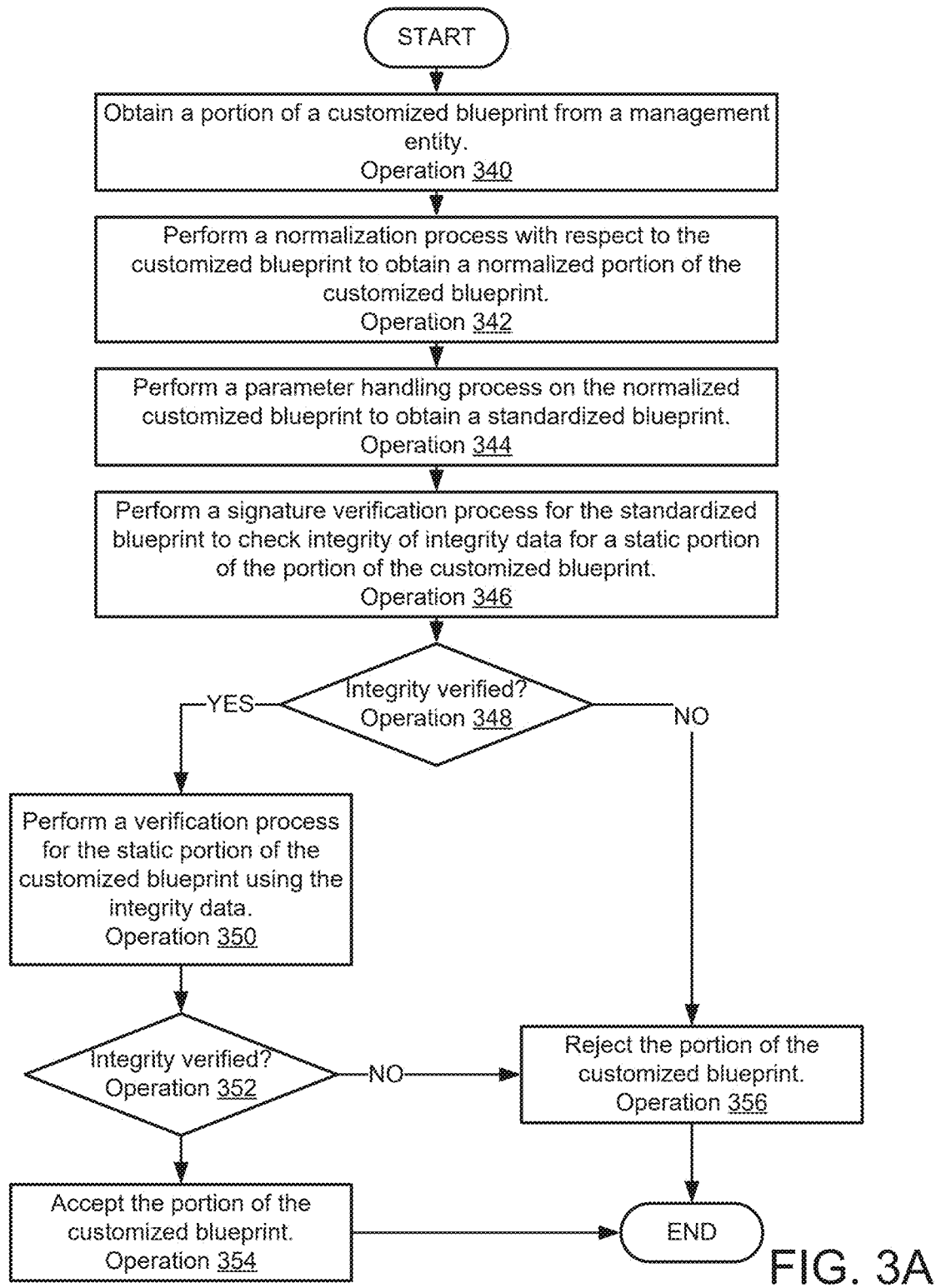
FIG. 3A shows a flow diagram illustrating a method in accordance with an embodiment.

As discussed above, the components of FIG. 1A may perform various methods to onboarding endpoint devices. FIG. 3A illustrates a method that may be performed by the components of the system of FIGS. 1A-2E. In the diagram discussed below and shown in FIG. 3A, any of the operations may be repeated, performed in different orders, and/or performed in parallel with or in a partially overlapping in time manner with other operations.

Turning to FIG. 3A, a flow diagram illustrating a method for managing operation of endpoint devices in accordance with an embodiment is shown. The method may be performed by any of the components of the system shown in FIG. 1A.

At operation 340, a portion of a customized blueprint is obtained from a management entity. The portion of the customized blueprint may be obtained by receiving it from the management entity. The management entity may be an orchestrator to which an endpoint device has onboarded.

Turning to FIG. 3B, a diagram showing an example of a signed customized blueprint in accordance with an embodiment is shown. As seen, the signed customized blueprint may be in person readable format, and may include various fields (e.g., diskimage, host name). Some fields may be parameterized and may indicate that content to be obtained and how it is to be used. Refer to FIGS. 3C-3D for example of how the content for the parameterized sections may be obtained. In this example, these parameterized sections may already be substituted with data established by an orchestrator (e.g., edgevm.iso, myhost.example.com).

The fields may generally be divided into sections (e.g., 360, 362) corresponding to different applications, devices, etc. For example, section 360 may include field for an edge application, and section 362 may include field relevant for a cloud system. The field may be marked with names, unique identifiers, etc. (e.g., edge_application:, cloud_application:).

In addition to the sections, the signed customized blueprint may also include integrity data 364 for each section. The integrity data may associate different sections with hash values or other types of integrity verification data. For example, the integrity verification data 8678768deace123abcde may be usable to verify the integrity of the static portion of section 360. During normalization and parameter handling, the dynamic content (e.g., "edgevm.iso", "myhost.example.com") may be removed or placed in condition so that it is not taken into account during integrity verification.

The signed customized blueprint may also include a signature section (e.g., delineated by the "approvals:" line). The signature section may include a signature generated using the integrity data 364 as an ingest. Thus, the signature from the signature section may be usable to verify the integrity data, and different portions of the integrity data may be usable to verify the integrity of the static content of corresponding sections (e.g., 360, 362).

The orchestrator may only send section 360, integrity data 364, and signature section 366 to an edge device, and may only send section 362, integrity data 364, and signature section 366 to a cloud system. Consequently, the cloud system may be unaware of the information from section 360 and the edge device may be unaware of section 362, but each may verify the integrity of their respectively obtained sections.

Returning to the discussion of FIG. 3A, at operation 342, a normalization process is performed with respect to the portion of the customized blueprint to obtain a normalized customized blueprint. The normalization process may be performed by modifying the content of the portion of the customized blueprint based on a set of rules designed to standardize the format of customized blueprints.

At operation 344, a parameter handling process is performed on the normalized portion of the customized blueprint to obtain a standardized blueprint. The parameter handling process may be performed by (i) identifying dynamic content and (ii) marking or removing the dynamic content (or making a copy and removing the dynamic content from the copy).

Turning to FIG. 3C, a diagram showing an example of a portion of an example of a normalized blueprint in accordance with an embodiment is shown. As seen, the portion may include a field (e.g., "hostname") and parameterization. The parameterization, in this example, has been removed (e.g., shown in lighter gray) so that only the remaining static content (e.g., "substitute: get_attribute", "substitute-allow-only: "*.mygroup.example.com") remains.

Returning to the discussion of FIG. 3A, at operation 346, a signature verification process for the standardized blueprint is performed to check integrity of integrity data for a static portion of the portion of the customized blueprint. The signature verification process may be performed by ingesting the integrity data into a signature verification algorithm. The algorithm may identify the integrity of the integrity data.

A public key may be used in the signature verification algorithm (e.g., may be the public key corresponding to the private signing key). The performance of the algorithm may identify whether the integrity data has been modified after the signature was generated.

At operation 348, a determination is made regarding whether the integrity of the integrity data is verified. If it is determined in operation 346 that the integrity data has been modified, then the integrity of the integrity data may not be able to be verified.

If the integrity cannot be verified, then the method may proceed to operation 356. Otherwise, the method may proceed to operation 350.

At operation 350, a verification process for the static portion of the portion of the customized blueprint is performed using the integrity data. The verification may be performed by (i) generating a hash of the static portion, and (ii) comparing the hash to a hash from the integrity data corresponding to the static content (e.g., the integrity data may specify which is for which section, and the static content may belong to one section). If the hashes match, then the integrity of the static content may be verified. Otherwise, the integrity may not be verified.

At operation 350, a determination is made regarding whether the integrity of the static portion was verified at operation 350. If verified, then the method may proceed to operation 354. Otherwise, the method may proceed to operation 352.

If the static content is successfully verified, then rules specified by the static content may be used to ascertain whether the parameter substitutions are valid.

For example, Turning to FIG. 3D, a diagram showing an example of a portion of an example of a rule from a customized blueprint in accordance with an embodiment is shown. As seen, the portion may include a field (e.g., "numcpus"), parameterization, and a static rule (e.g., "substitution-logic-allow: ($VALUE>=2) & ($Value<=8)") for the parameterization. This static rule may limit the range of values that may be substituted into the field.

Returning to the discussion of FIG. 3A, if all of the parameter substitutions meet the corresponding rule, then the parameters may also be treated as valid. However, if any substitution violates the corresponding rules, then the customized blueprint may not be valid (e.g., lacking integrity, may proceed to operation 356 rather than 354).

At operation 354, the portion customized blueprint is accepted. If accepted, the endpoint device may use the portion of the customized blueprint to update its operation. Following updating, the endpoint device may provide different types of computer implemented services.

At operation 356, the portion of the customized blueprint is rejected. If rejected, then the endpoint device may refuse to use the portion of the customized blueprint to update its operation. The endpoint device may continue to provide the same computer implemented services that it had previously provided. Additionally, various remedial actions such as issuing alerts, heightening a security posture, etc. may be performed to reduce the likelihood of the endpoint device being compromised.

The method may end following operations 354 or 356.

Thus, using the method shown in FIG. 3A, embodiments disclosed herein may reduce the likelihood of endpoint devices and/or other devices being compromised via blueprints used to manage their operation.

Figure 4:
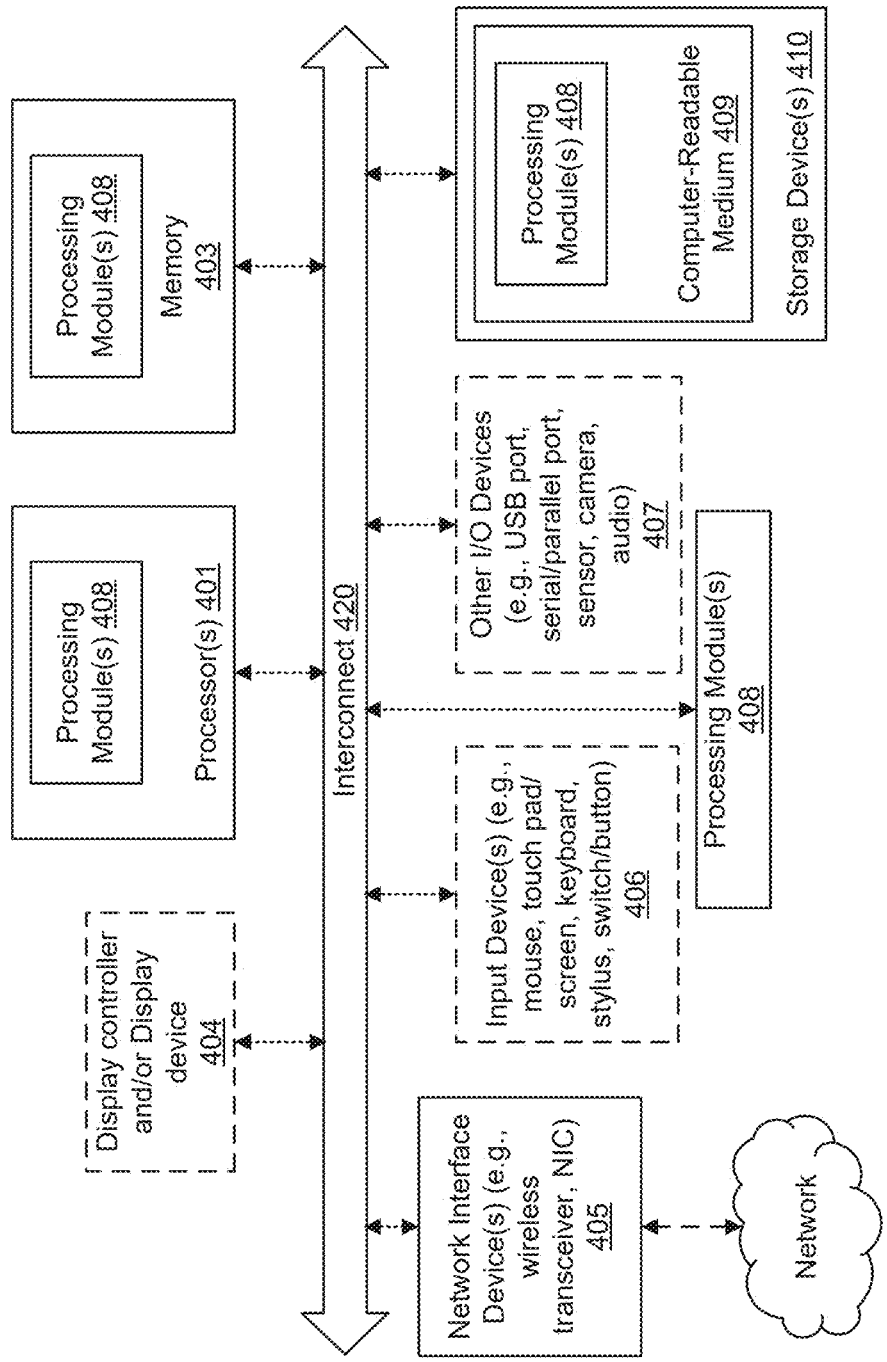
FIG. 4 shows a block diagram illustrating a data processing system in accordance with an embodiment.

Any of the components illustrated in FIGS. 1A-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 420. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 420 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 410 may include computer-readable storage medium 409 (also known as a machine-readable storage medium or a computer-readable medium) on which is stored one or more sets of instructions or software (e.g., processing module, unit, and/or processing module/unit/logic 408) embodying any one or more of the methodologies or functions described herein. Processing module/unit/logic 408 may represent any of the components described above. Processing module/unit/logic 408 may also reside, completely or at least partially, within memory 403 and/or within processor 401 during execution thereof by system 400, memory 403 and processor 401 also constituting machine-accessible storage media. Processing module/unit/logic 408 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 408, components and other features described herein can be implemented as discrete hardware components or integrated in the functionality of hardware components such as ASICS, FPGAs, DSPs or similar devices. In addition, processing module/unit/logic 408 can be implemented as firmware or functional circuitry within hardware devices. Further, processing module/unit/logic 408 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of an endpoint device, the method comprising:
   obtaining a customized blueprint from a management entity;
   performing a normalization process with respect to the customized blueprint to obtain a normalized customized blueprint;
   performing a parameter handling process on the normalized customized blueprint to obtain a standardized blueprint;
   performing a signature verification process for the standardized blueprint to check integrity of integrity data for a static portion of the customized blueprint;
   in a first instance of the performing of the signature verification where the integrity of the integrity data is not compromised:
      performing a verification process for the static portion of the customized blueprint using the integrity data;
      in a first instance of the performing of the verification process where the static portion of the customized blueprint is successfully verified:
         accepting the customized blueprint; and
      in a second instance of the performing of the verification process where the static portion of the customized blueprint is successfully verified:
         rejecting the customized blueprint.

2. The method of claim 1, further comprising:
   based at least on the customized blueprint being accepted, updating operation of the endpoint device based on the static portion and parameters provided by the management entity.

3. The method of claim 2, further comprising:
   based on the customized blueprint being accepted, performing a rule verification process for the parameters provided by the management entity, the rule verification being performed using rules from the static portion,
   wherein the updating the operation of the endpoint device is also based on an outcome of the rule verification.

4. The method of claim 1, wherein the customized blueprint comprises:
   a first portion comprising a portion of static content and a portion of dynamic content;
   a second portion comprising the integrity data for the static content of the first portion; and
   a third portion comprising a signature portion for the second portion.

5. The method of claim 4, wherein the customized blueprint is based on a non-customized blueprint comprising:
   a fourth portion comprising the portion of the static content and a first portion parameterizations;
   a firth portion comprising a second portion of static content and a second portion of parameterizations;
   the second portion; and
   the third portion.

6. The method of claim 5, wherein the portion of the static content is for a first endpoint device, the second portion of static content is for another device, and the customized blueprint does not comprise the second portion of static content.

7. The method of claim 5, wherein the integrity data comprises a hash based on the portion of the static content.

8. The method of claim 7, wherein the integrity data further comprises a hash based on the second portion of static content, and only the hash for the second portion of static content is not used during the verification process.

9. The method of claim 1, wherein the normalization process comprises substituting portions of the customized blueprint with standardized portions based on a set of substitution rules.

10. The method of claim 9, wherein the substitution rules require, at least:
   replacement of all separators with a first standardized symbol;
   removal of blank lines;
   collapsing of contiguous white spaces to a single space;
   removal of comments;
   removal of whitespaces that are not necessary for machine interpretation;
   expression of dictionary and array attributes as multi-line; and
   ordering of dictionary keys in alphabetical order.

11. The method of claim 9, wherein the normalization process is adapted to remove content perceived to facilitate human interpretation from yet another markup language (YAML) based files.

12. The method of claim 1, wherein the parameter handling process discriminates management entity made parameterized substitutions of the customized blueprint from original non-parameterized content from a non-customized blueprint that is signed by an author of the non-customized blueprint.

13. A non-transitory machine-readable medium having instructions stored therein, which when executed by a processor, cause the processor to perform operations for managing an endpoint device, the operations comprising:
   obtaining a customized blueprint from a management entity;
   performing a normalization process with respect to the customized blueprint to obtain a normalized customized blueprint;
   performing a parameter handling process on the normalized customized blueprint to obtain a standardized blueprint;
   performing a signature verification process for the standardized blueprint to check integrity of integrity data for a static portion of the customized blueprint;
   in a first instance of the performing of the signature verification where the integrity of the integrity data is not compromised:
      performing a verification process for the static portion of the customized blueprint using the integrity data;
      in a first instance of the performing of the verification process where the static portion of the customized blueprint is successfully verified:
         accepting the customized blueprint; and
      in a second instance of the performing of the verification process where the static portion of the customized blueprint is successfully verified:
         rejecting the customized blueprint.

14. The non-transitory machine-readable medium of claim 13, wherein the operations further comprise:
   based at least on the customized blueprint being accepted, updating operation of the endpoint device based on the static portion and parameters provided by the management entity.

15. The non-transitory machine-readable medium of claim 14, wherein the operations further comprise:
   based on the customized blueprint being accepted, performing a rule verification process for the parameters provided by the management entity, the rule verification being performed using rules from the static portion,
   wherein the updating the operation of the endpoint device is also based on an outcome of the rule verification.

16. The non-transitory machine-readable medium of claim 13, wherein the customized blueprint comprises:
   a first portion comprising a portion of static content and a portion of dynamic content;
   a second portion comprising the integrity data for the static content of the first portion; and
   a third portion comprising a signature portion for the second portion.

17. An endpoint device, comprising:
   a processor; and
   a memory coupled to the processor to store instructions, which when executed by the processor, cause operations to be performed, the operations comprising:
      obtaining a customized blueprint from a management entity;
      performing a normalization process with respect to the customized blueprint to obtain a normalized customized blueprint;
      performing a parameter handling process on the normalized customized blueprint to obtain a standardized blueprint;
      performing a signature verification process for the standardized blueprint to check integrity of integrity data for a static portion of the customized blueprint;
      in a first instance of the performing of the signature verification where the integrity of the integrity data is not compromised:
         performing a verification process for the static portion of the customized blueprint using the integrity data;
         in a first instance of the performing of the verification process where the static portion of the customized blueprint is successfully verified:
            accepting the customized blueprint; and
         in a second instance of the performing of the verification process where the static portion of the customized blueprint is successfully verified:
            rejecting the customized blueprint.

18. The endpoint device of claim 17, wherein the operations further comprise:
   based at least on the customized blueprint being accepted, updating operation of the endpoint device based on the static portion and parameters provided by the management entity.

19. The endpoint device of claim 18, wherein the operations further comprise:
   based on the customized blueprint being accepted, performing a rule verification process for the parameters provided by the management entity, the rule verification being performed using rules from the static portion,
   wherein the updating the operation of the endpoint device is also based on an outcome of the rule verification.

20. The endpoint device of claim 17, wherein the customized blueprint comprises:
   a first portion comprising a portion of static content and a portion of dynamic content;
   a second portion comprising the integrity data for the static content of the first portion; and
   a third portion comprising a signature portion for the second portion.

* * * * *